Nov. 16, 1943.  E. H. MUELLER  2,334,346

VALVE

Filed Jan. 23, 1942

INVENTOR.
Ervin H. Mueller
BY
Barnes, Kisselle, Laughlin & Raisch

Patented Nov. 16, 1943

2,334,346

UNITED STATES PATENT OFFICE 2,334,346

VALVE

Ervin H. Mueller, Grosse Pointe, Mich., assignor to Lincoln Brass Works, Inc., Detroit, Mich., a corporation of Michigan Application January 23, 1942, Serial No. 427,862

2 Claims. (Cl. 277—56)

This invention relates to a valve, and particularly to one useful for controlling the supply of gaseous fuel to a burner for gas stoves or other heating units.

The principal object of the invention is to provide an improved valve of the type where two ported and relatively movable elements have flat or plane facial surfaces which contact each other and wherein the ports may be brought into and out of alignment or partial alignment to establish a flow connection or shifted out of alignment for closing the valve. Among the objects is the provision of a construction in a valve of this type wherein different volumes of fuel may be passed through the valve for controlling, for example, a high flame and a low or simmer flame.

The commercial practice has been, in connection with the gas stove art or other gas control valves, to use, practically entirely, valves of the tapered plug type. Such a valve usually included a body with a tapered chamber and a valve member or plug of tapered or frusto-conical form for seating in the chamber, and the valve body and plug member were suitably ported and the ports controlled by relative rotation. Considerable machine work is required in a valve of this kind, but the valves were usually made of brass which is relatively easily machined. Ferrous metal such as iron or steel, and particularly cast iron, is considerably more difficult to machine, and it follows that a valve structure having flat engaging surfaces can more readily be made of iron because of the less difficult machining. The valve of the present invention, therefore, offers a construction which is nicely adapted to be formed of iron, although obviously the construction can be made of brass or other metals.

A valve construction for carrying out the invention is shown in the accompanying drawing wherein Fig. 1 is a cross sectional view of the valve, showing the same in full "on" position.

Figure 1:
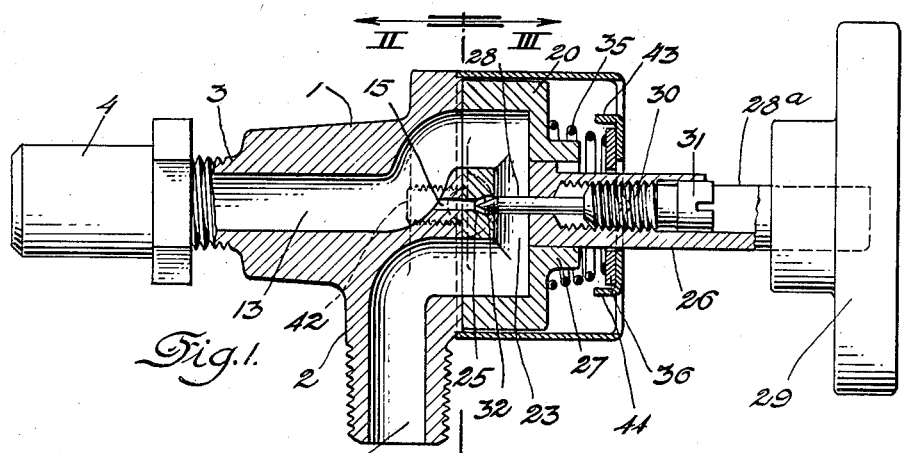

The valve body, as shown at 1, is formed with an inlet extension 2 which may be threaded, and an outlet extension 3 which may be equipped with the usual jet and hood 4. The body may also have extending attaching ears or lugs 5 and 6, the threaded openings of which are preferably disposed at different distances from the center for purposes which will presently appear.

The valve body has an accurately machined flat sealing face 10. An inlet passage 11 extends through the extension 2 and opens through the face in the form of a port 12. The outlet passage 13 is offset in the body and opens through the sealing face 10 in the form of a port 14. In the form of valve shown the ports 12 and 14 are substantially diametrically opposite each other. The body is provided with an additional small port 15 which is centrally located and which intersects the outlet 13 as indicated. The face 10 may be provided with one or more recesses 16 which constitute pockets for containing a quantity of suitable lubricating material.

The cooperating valve member is generally shown at 20 and it has a flat accurately machined face designed to abut the face 10. The two faces are preferably lubricated, a quantity of which is retained in the pockets 16. The valve member 20 has a port 22 and a port 24 connected by a transverse passage 23. The ports 22 and 24 open through the face of the valve member 20 and are on the same radius as the ports 12 and 14. The valve member also has a small port 25 centrally disposed for alignment with the port 15 and which connects to the passage 23.

An operating stem 26 which is preferably of a separate piece of metal from the member 20 is non-rotatably secured to the member 20 at a hub 27, and this operating stem is of hollow construction. The stem is flattened at its outer end as at 28a so that it has a D formation for the reception of a handle 29.

The hollow stem is provided with internal threads for the reception of the threaded portion of a needle valve 30 which has an end or head 31 designed to receive a screw driver or other suitable turning tool. The threaded engagement of this needle valve with the hollow of the stem is preferably sufficiently tight to form an adequate gas seal. The needle portion of this needle valve as at 28 extends toward and preferably on the axial center of the port 25 and its end is sharpened or pointed as at 32. Thus it will be observed that by advancing or retracting the needle valve the entrance into the port 25 may be metered or entirely closed if the pointed end of the needle is caused to seat in the aperture 25. The port 22 has a circumferential extension 33 which is designed to register or partially register with the port 12 when the port 24 is out of registry with the port 14.

The remaining valve structure includes a cap and spring means for holding the parts together and for controlling the rotary movements of the valve member 20. To this end, a coiled spring 35 is positioned between the head 20 and a washer 36. This washer has an extension 37 in the form of a finger and it has an inwardly extending projection 38 which forms a loose but non-rotatable connection with the D formation of the stem. In other words, while the washer is generally caused to rotate with the stem, it has some rotary movement relative thereto. This washer is provided with one or more projections 39, there being three of such projections shown.

The cap may be a stamping of cup form as shown at 40 having apertured extensions 41. The apertures in these extensions are on different radii from the center corresponding to the apertures in the ears 5 and 6. The cap is secured to the body by screws 42. The cap can only be assembled in one way due to the fact that one set of apertures is further removed from the center than the other set. The bottom of the cup or cap is provided with inwardly extending lugs 43 and 44 which are struck out of the metal, and the bottom of the cap is also provided with formations designed to cooperate with the projections 39 on the washer. These formations are in the form of internal depressions formed in the bottom of the cap and which appear on the exterior of the cap as projections, and these formations are shown at 45.

Figures 2, 3:
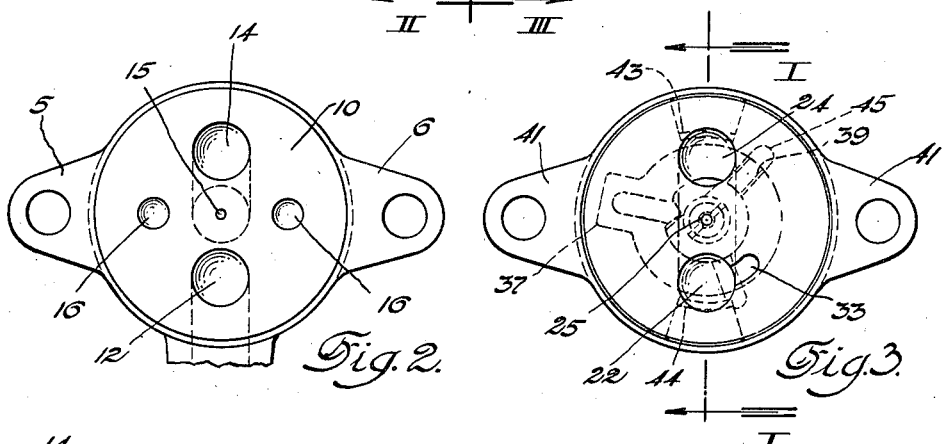
Fig. 2 is an elevational view showing the bearing face of the valve body.
Fig. 3 is an elevational view showing the bearing face of the valve member and illustrating in dotted lines the washer member for limiting rotation.
Figures 4, 5:
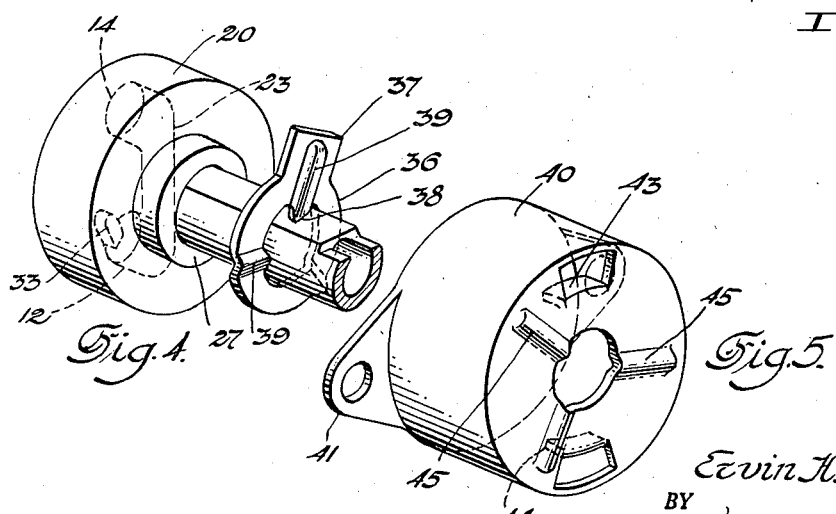
Fig. 4 is a perspective view of the valve member with the controlling washer mounted thereon, but does not indicate any relative positions.
Fig. 5 is a perspective view of the cap.

It will be seen that the coil spring holds the valve member 20 seated with pressure against the valve body, and the contacting surfaces provide a seal. When the ports 12 and 22 are in full or substantially full alignment or registration, the ports 24 and 14 are similarly registered and there is a full flow of gas through the valve. If the valve member be turned so that only the extension 33 registers or partially registers with the port 12, then the ports 14 and 24 are disaligned and the only escape of gas through the valve is through the metered orifice or port 25 and the aligned port or orifice 15. When the ports in the valve member 20 are completely disaligned from the ports in the body the valve is "off." The rotary movements of the valve member are limited to about 180° or less, and in the arrangement shown the "off" position is when the finger 37 abuts one side of the stop 44. At this time the projections 39 on the washer ride against the surface of the under side of the cap. If the valve member be turned now about 90°, the projections 39 snap into the cooperating formations 45. This is caused by the spring and permitted because of the relative movement of the washer relative to the stem. This provides not only an audible sound but also requires an additional torque to further turn the valve member. At this time the ports are substantially aligned for the full "on" position—that is to say, ports 12 and 22 are in registry and ports 14 and 24 are in registry. This full "on" position of the finger 37 is shown in Fig. 3. Further counter-clockwise movement of the valve (clockwise as Fig. 3 is viewed) brings the finger 37 up against the stop 43. This further turning is slightly resisted by the necessity of forcing the projections 39 out of the projection 45 and thus providing additional intelligence to the operator. When the finger 37 abuts the stop 43 ports 14 and 24 have been moved out of registry, but the circumferential elongation 33 registers with or partially registers with the port 12 so that gas may enter the passage 23 but flows out only through the small ports 15 and 25, which are always in registry and which flow may be metered by the needle valve to govern the low or simmer flame. Of course, when the valve is full "on" with the ports 12 and 22 and 14 and 24 in registration or partial registration, gas may also flow through the ports 15 and 25, but this makes no difference because the intention is that there is a full supply of gas anyway.

Where it is said, in the specification or claims, the certain ports are aligned or in registry, the meaning is that they are in such communication that fluid may pass therethrough, even though the alignment or registration is inaccurate or only partial.

I claim:

1. A valve for controlling the flow of fluid fuel to a burner or the like comprising, a body member with a flat bearing face having an inlet port and an outlet port opening through the face, a disc type valve member having a flat bearing face for rotatably seating on the bearing face of the body member and having an inlet port and an outlet port opening through its bearing face, a passage within the body of the disc type valve member connecting its inlet and outlet ports, all of said ports being located off the center of rotation of the disc type valve member and on radii so that the inlet ports and the outlet ports may be brought into and out of registration upon relative rotation between the disc type valve member and body member, an operating stem on the disc type valve member, a cap secured to the body member, the operating stem extending through the bottom of the cap, said cap having side walls closely fitting the disc type valve member for substantially centering and providing a piloting bearing therefor, and spring means between the disc type valve member and the bottom of the cap for holding the disc type valve member against the bearing face of the body member.

2. A valve for controlling the flow of fluid fuel to a burner or the like comprising, a body member, a valve member, means holding the members in assembly with the valve member rotatable relative to the body member, the body member having a bearing face in a plane radial to the axis of rotation of the valve member, the valve member having a bearing face in a plane radial to the axis of rotation, means for holding the bearing faces in abutting relationship, the body member having an inlet port and an outlet port opening through its bearing face, said body member having an outlet passage leading from the outlet port, the valve member having an inlet port and an outlet port opening through its bearing face, said valve member having a passageway within its body connecting its inlet and outlet ports so that all passageways are sealed by the abutting bearing faces, said ports being removed from the axis of rotation and on radii so that the inlet ports and the outlet ports may be brought into and out of registry by the rotation of the valve member, an auxiliary port in the body member disposed substantially on the axis and opening through the bearing face of the body member and communicating with the outlet passage in the body member, an auxiliary port in the valve member disposed substantially on the axis and opening through the bearing face of the valve member and communicating with the said passageway in the valve member whereby the auxiliary ports are in constant communication, an operating stem of hollow form on the valve member, a needle metering valve mounted in the hollow stem and arranged to project into and substantially across the said passageway in the valve member, means for mounting the needle valve for axial adjustment thereof for metering the auxiliary port in the valve member and a circumferentially extending extension on one of the inlet ports adapted to register or partially register with the other of the inlet ports when the outlet ports of the body member and valve member are out of registry.

ERVIN H. MUELLER.